(No Model.)
M. BROCK.
LASTING MACHINE.
No. 288,689. Patented Nov. 20, 1883.
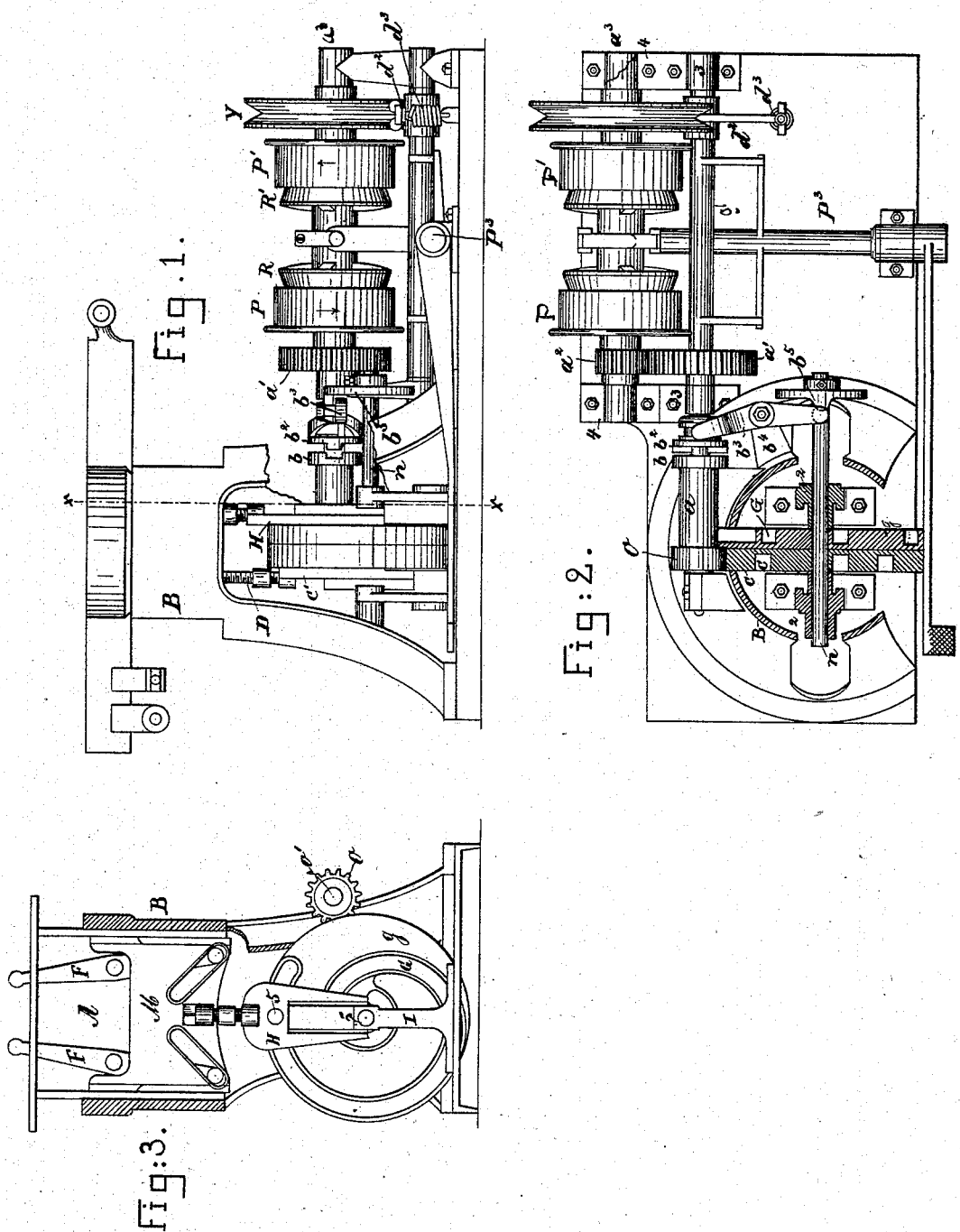
Witnesses.
Inventor.
Matthias Brock
by Crosby & Gregory attys

UNITED STATES PATENT OFFICE.

MATTHIAS BROCK, OF BOSTON, MASSACHUSETTS, ASSIGNOR TO THE McKAY & COPELAND LASTING MACHINE COMPANY, OF PORTLAND, MAINE.

LASTING-MACHINE.

SPECIFICATION forming part of Letters Patent No. 288,689, dated November 20, 1883.

Application filed October 1, 1883. (No model.)

*To all whom it may concern:*

Be it known that I, MATTHIAS BROCK, of Boston, county of Suffolk, State of Massachusetts, have invented an Improvement in Lasting-Machines, of which the following description, in connection with the accompanying drawings, is a specification, like letters on the drawings representing like parts.

This invention is an improvement on United States Letters Patent No. 213,857, granted April 1, 1879, to which reference may be had, and has for its object to avoid breaking or straining the parts by the arrival of the roller-studs, connected with the yokes which actuate the cross-head and sliding-plate, at the ends of the scroll cam-grooves, which give motion to the said parts. To obviate these difficulties I have provided the machine with a clutch and means to operate the same, whereby the said cams are stopped just before the ends of the scroll cam-grooves reach the said roller-studs.

Figure 1 is a partial side elevation of enough of a lasting-machine such as described in the said patent to enable my improvements to be understood. Fig. 2 is a top view of Fig. 1, and Fig. 3 is a section on the line $x\,x$, Fig. 1, looking toward the left.

The cross-head A, frame B, sliding plate M, yokes $c'$ and H, rod D, levers F, cam-disks $c\,g$, provided, respectively, with scroll cam-grooves C' and G, and roller-studs 5, carried by the said yokes and entering the said cam-grooves, are substantially as in the said patent. In this instance the cam-disks $c$ and $g$ are connected together and to the same shaft, $n$, supported in bearings 2 2, and the edge of disk $c$ is toothed, to be engaged and driven by a pinion, O, fast to a sleeve, $a$, on a shaft, $o'$, supported in bearings 3 3, and provided with a pinion, $a'$, which is engaged and driven by a pinion, $a^2$, fast on the main shaft $a^3$, supported in suitable bearings, 4, the said shaft having loose upon it two belt-pulleys, P P', provided with conical faces and driven in opposite directions, as in the said patent, there being between the said pulleys a suitable conical-headed quill, R R', which is splined on the shaft $a^3$, so that movement of the said headed quill, by a suitable rock shaft or lever, P³, causes one or the other of the ends of the quill to engage one or the other of the said pulleys and drive the shafts $a^3$ $o'$ in one or the other direction.

The end of the sleeve $a$ has a notched plate, $b$, which co-operates with a notched hub, $b^2$, splined upon the shaft $o'$ and provided with an annular groove, which is embraced by the end of a lever or shipper, $b^3$, pivoted at $b^4$. The lever $b^3$, at its rear end, has a pin or stud which is acted upon by a cam or tappet, $b^5$, secured to the shaft $n$, and moved in unison with it, the high point of the said cam or tappet being so located with relation to the inner ends of the scroll cam-grooves C and G that the shipper or lever will be moved, as in Fig. 3, to unclutch the clutch, composed of the parts $b\,b^2$, just before the roller-studs 5—one in each yoke H and $c'$—arrive at the inner ends of the respective grooves G and C, thus releasing the sleeve $a$ and permitting the cam-disks $c$ and $g$ and shaft $n$ to stop. When the conical-headed quill is in its central position a suitable brake, $d^2$, controlled by a thumb-screw and spiral spring, $d^3$, will operate upon the brake-wheel Y, substantially as in the said patent.

I claim—

1. The cam-grooved disk and pinion to turn it and a cam or tappet moved in unison with the said disk, combined with a clutch to determine the times of movement of the said pinion and disk, and with means, substantially as described, under the control of the said cam or tappet to effect the disengagement of the said clutch at a predetermined position of the cam-disk, substantially as described.

2. The rotating shaft $a^3$, its gear, the gear $a'$, shaft $o'$, clutch-hub $b^2$, splined thereon, means, substantially as described, to move the same when the cam-grooved disk is turned to occupy a definite position, and the sleeve $a$ and its pinion and clutch part, combined with a cam-grooved disk, to operate substantially as set forth.

In testimony whereof I have signed my name to this specification in the presence of two subscribing witnesses.

MATTHIAS BROCK.

Witnesses:
 G. W. GREGORY,
 B. J. NOYES.